United States Patent

Knauer

[15] 3,649,748

[45] Mar. 14, 1972

[54] METHOD AND APPARATUS FOR MODIFYING ELECTRICAL SIGNALS

[72] Inventor: Paul E. Knauer, Fort Wayne, Ind.

[73] Assignee: The Magnavox Company, Fort Wayne, Ind.

[22] Filed: May 12, 1969

[21] Appl. No.: 823,781

[52] U.S. Cl. ..................178/5.4 HE, 178/5.2 R, 178/5.4 SD, 178/5.4 MC

[51] Int. Cl. ..........................................................H04n 9/12

[58] Field of Search .............178/5.4 HE, 5.4 R, 5.4 F, 5.4 H, 178/5.4 PD, 5.4 ML, 5.2 R, 5.2 A, 5.4 SD

[56] References Cited

UNITED STATES PATENTS

| | | | |
|---|---|---|---|
| 2,888,514 | 5/1959 | Pritchard | 178/5.4 |
| 2,976,351 | 3/1961 | Loughlin | 178/5.4 |
| 3,315,170 | 4/1967 | Baker | 178/5.4 |
| 3,454,708 | 7/1969 | Curtis et al. | 178/5.4 |
| 2,918,523 | 12/1959 | Shapiro | 178/5.2 |
| 3,536,827 | 10/1970 | Bell | 178/5.4 |

*Primary Examiner*—Richard Murray
*Assistant Examiner*—Peter M. Pecori
*Attorney*—Pendleton, Neuman, Williams & Anderson

[57] ABSTRACT

A plurality of flesh expander circuits for expanding the phase range in a received chrominance signal which will produce a color having a hue characteristic of flesh on the picture tube face of a color television receiver are disclosed. The circuits detect the presence of a color near flesh in that signal and then modify it to produce a color more closely approximating flesh. A first type achieves the modification by adding an appropriate quadrature correction signal to the chrominance signal. A second type suppresses the portions of the chrominance signal near flesh and inserts a new signal more closely approximating flesh.

39 Claims, 11 Drawing Figures

1

INVENTOR
Paul E. Knauer by Pendleton, Neuman, Seibold and Williams
Att'ys

METHOD AND APPARATUS FOR MODIFYING ELECTRICAL SIGNALS

BACKGROUND OF THE INVENTION

This invention relates to electric circuits for detecting when the information in a received signal is within a predetermined range and then modifying that received signal toward a preset reference. More particularly, it relates to circuits for use in color television systems for determining when the hue information in a received chrominance signal is within a predetermined range of that which produces a flesh color and then modifying that chrominance signal so that it will produce a color on the face of the receiving tube more closely approximating flesh.

One of the problems with consumer acceptance of color television in the past has been the variability of flesh colors in the reproduced picture. Flesh is the one color for which most viewers have a readily available reference; they can easily tell when it deviates from a norm but are not as aware of or incensed by deviations in other colors. In the conventional American, NTSC compatible color transmission system, the reproduced colors depend critically on the phase relationship of the color burst and the chrominance signal in the received video channel. That phase relationship often varies with changes in channel, changes in station camera or other origination equipment, or changes in transmission equipment. The result is that a critical viewer may have to readjust the "-hue" or "tint" control of his receiver every time such a change occurs. Additionally, various forms of aberrations in reproduced flesh tones have been observed resulting from poor video tape machine maintenance. It is not possible to cure such aberrations through normal receiver adjustments.

There are presently no known methods for solving the phase variation problem in NTSC color systems or providing color correction or improvement in the observed picture. Various European systems deal with this problem in part, but are more complex than the NTSC system and do not compensate for such variations as those from changes in camera or other originating equipment or from changes in scene lighting. It has, however, been empirically determined that an acceptable compromise may be reached if all signals in the received video channel which would normally produce a hue on the picture tube face within a predetermined range of flesh are altered so that they will reproduce a flesh color.

SUMMARY OF THE INVENTION

This invention provides methods and apparatus for reducing the effect of errors in information transmission systems by expanding at the receiver the range of received signals which will produce a critical output. In a more limited form, this invention provides methods and apparatus for use with color television systems which expand the range of received signals that produce a critical color, normally flesh. Circuitry is provided which detects the presence of a received signal normally producing an output within a predetermined range of the critical output and modifying it to produce the critical output.

It is thus an object of this invention to provide methods and apparatus in an information transmission system for expanding the range of received signals that produce a critical output.

It is an object of this invention to provide methods and apparatus for use in information receivers for modifying the received signal to expand the range of received signals which will produce a critical output.

It is an object of this invention to provide methods and apparatus in color television systems for expanding the range of received signals which will produce a critical color.

It is an object of this invention to provide methods and apparatus in color television receivers for modifying a received signal to expand the range of received signals which will produce a critical color.

It is an object of this invention to provide methods and apparatus in color television systems for detecting the presence in a received signal of a component corresponding to a hue near flesh and modifying that signal to one which will reproduce a flesh color.

It is an object of this invention to provide a method and apparatus in color television systems for detecting the presence in a received chrominance signal of a component having a phase within a predetermined range including the phase corresponding to the production of a flesh color on the face of the viewing tube and adding to that received signal another signal such that the sum will have a phase more closely corresponding to flesh.

It is an object of this invention to provide a method and apparatus in color television systems for detecting the presence in a received chrominance signal of a component having a phase within a predetermined range including the phase corresponding to the production of a flesh color on the face of the viewing tube, suppressing that component in the received signal, and adding to that signal another component having a phase more closely corresponding to flesh.

It is an object of this invention to provide methods and apparatus for correcting flesh colors in color television receivers characterized by simplicity of design and economy of construction.

Further and additional objects will appear from the following specification, appended claims, and accompanying drawing.

DESCRIPTION OF THE PREFERRED EMBODIMENTS

In the subsequent specification, this invention will be described in relation to flesh corrector apparatus and methods for use in conventional, American compatible color television receivers using the NTSC color transmission system. It will be obvious to those skilled in the art that the disclosed signal correction apparatus and methods can be adapted both to other types of color television transmission systems and to systems for transmitting other types of information.

Figure 1:
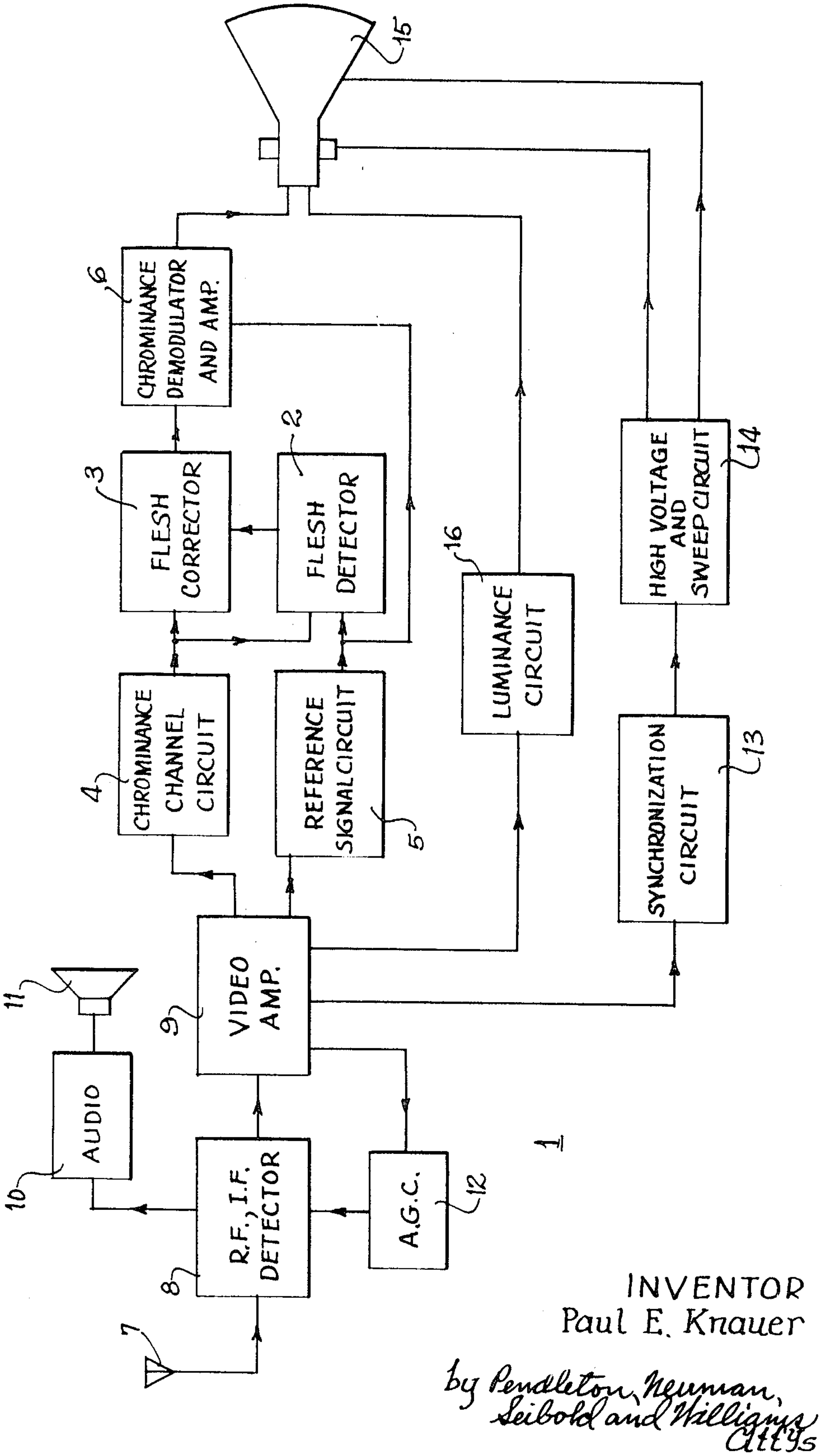
FIG. 1 is a block diagram of a receiver incorporating a generalized embodiment of this invention.

A generalized embodiment 1 of the present invention is disclosed in FIG. 1. It comprises a flesh detector 2 having an output connected to a first input of a flesh corrector 3. Flesh detector 2 additionally has first and second inputs coupled to outputs of a chrominance channel circuit 4 and a reference signal circuit 5; flesh corrector 3 has a second input connected to the output of chrominance channel circuit 4 and an output connected to an input of a chrominance demodulator and amplifier 6. Chrominance channel circuit 4, reference signal circuit 5, and chrominance demodulator and amplifier 6 are all parts of a conventional American compatible color television receiver making use of the NTSC transmission system; their construction is, therefore, well known and it will be necessary to give only a brief description of their function.

Except for the components discussed in the above paragraph, the remainder of the circuitry of FIG. 1 is that of a conventional color television receiver. Briefly, an antenna 7 is connected to the input of a stage 8 which amplifies the received radio frequency signals, converts it to an intermediate frequency signal, amplifies that intermediate frequency signal, and then detects the amplitude modulated waveform of the intermediate frequency signal to recover the video signal. That video signal is applied to and amplified by a video amplifier stage 9. A second output from stage 8 is applied to audio stage 10 which detects and amplifies the frequency modulations in the intermediate frequency signal to recover the intercarrier sound signal and applies that to a sound reproducer or speaker 11. A first output from video amplifier 9 is applied to automatic gain control circuit 12 which is, in turn, coupled to stage 8 for varying the gain of that stage to compensate for variation in amplitude of the received signal. A second output from video amplifier 9 is applied, in turn, to a synchronization circuit 13, which recovers the synchronization information from the received video signal, and a high voltage and sweep circuit 14, which develops the required deflection signals and high voltages and applies them to a deflection yoke on and an accelerating electrode in picture tube 15, respectively. A third output from video amplifier 9 is applied to a luminance circuit 16 which applies the required luminance signal to the electron guns of picture tube 15. Outputs from video amplifier 9 are additionally connected to chrominance channel circuit 4 and reference signal circuit 5. The output from reference signal circuit 5 is also coupled to chrominance demodulator and amplifier 6. The chrominance signal output of demodulator 6 is applied to the electron gun structure in picture tube 15.

Chrominance channel circuit 4 delivers at its output the modulated chrominance subchannel signal; its output is normally taken from the bandpass amplifier. Reference signal circuit 5 delivers a 3.58 MHertz sine wave, nominally at I phase, to flesh detector 2. Flesh detector 2 compares the phase of the received signal from chrominance circuit 4 with that of the continuous wave, 3.58 MHertz reference signal from circuit 5 to detect when the received signal phase is within a predetermined range of the reference signal phase. Since the reference signal is nominally at I phase which corresponds to a flesh color in the reproduced picture, flesh detector 2 thus determines when the hue of the received chrominance signal is within a predetermined range of flesh. Flesh corrector 3 is such that when flesh detector 2 indicates that the received chrominance signal hue is near flesh, it modifies that received signal into a signal having a hue more closely approximating flesh.

Two general modes of operation for flesh corrector 3 are disclosed in the two specific embodiments disclosed below. In the first, the flesh corrector 3 adds an additional signal, preferably in quadrature, to the received chrominance signal so that their sum more closely approximates flesh. In the second, the flesh corrector 3 suppresses those parts of the received chrominance signal having a hue near flesh and inserts a new signal more closely approximating flesh. The construction and operation of flesh detector 2 and flesh corrector 3 will be clear from the subsequent discussion of the two specific embodiments. It will be seen that the flesh correction of this invention is achieved at some sacrifice in the hues immediately adjacent flesh. It has been empirically determined that this sacrifice is acceptable to or unnoticed by most viewers.

Figure 2:
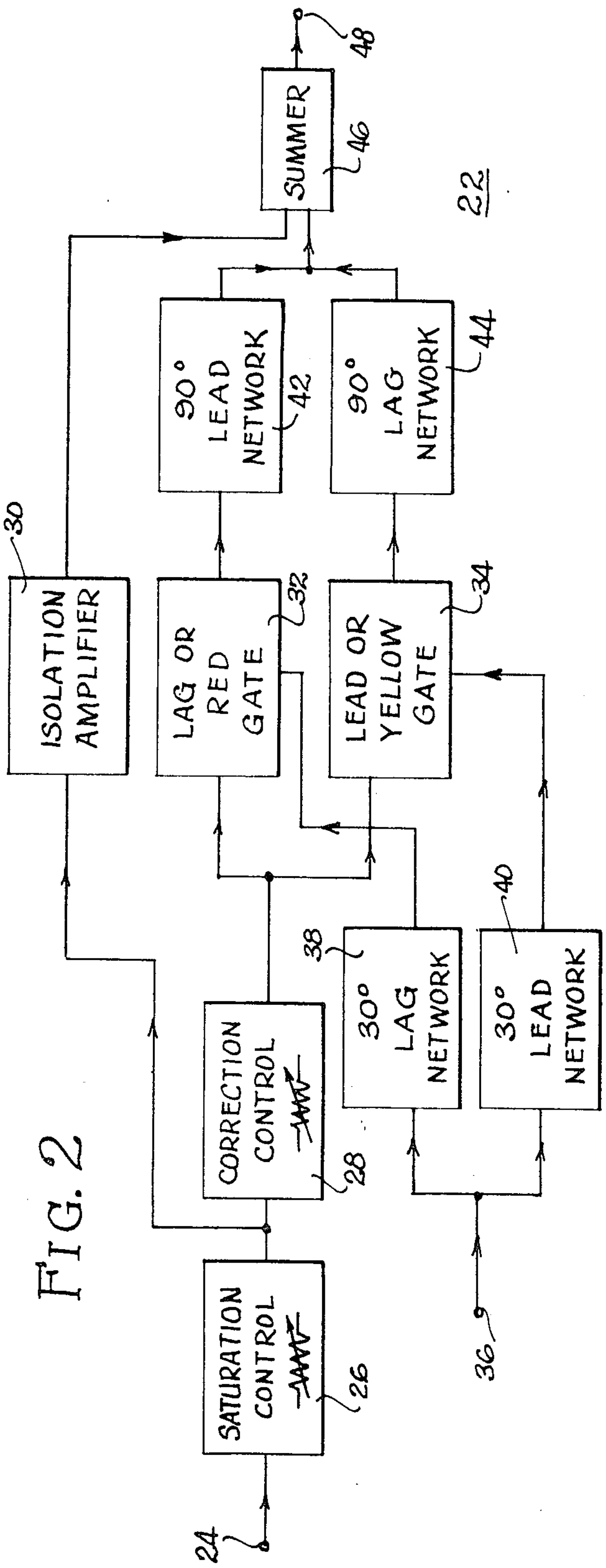
FIG. 2 is a block diagram of an apparatus incorporating a first specific embodiment of this invention.

A first specific embodiment 22 of this invention is disclosed in FIG. 2. A modulated chrominance subchannel signal is applied to input terminal 24 from chrominance circuit 4 in FIG. 1 and then to the input of saturation control 26, which may conveniently comprise a variable resistance for varying the signal magnitude at its output. The output of saturation control 26 is applied to inputs to a correction control 28 and an isolation amplifier 30. Correction control 28 may conveniently comprise a variable resistance for varying the magnitude of the signal at its output and thus the degree of flesh correction. The output of correction control 28 is applied to both an input of a lag or red gate 32 and an input of a lead or yellow gate 34. A 3.58 MHertz continuous wave reference signal at I phase is applied from circuit 5 in FIG. 1 to terminal 36 and then to an input of a 30° lag network 38 and an input of a 30° lead network 40. Lag network 38 and lead network 40 produce 3.58 MHertz output signals which lag and lead, respectively, the reference signal applied to terminal 36 by 30°. The output of lag network 38 is applied to a second input of lag gate 32 and the output of lead network 40 is applied to a second input of lead gate 34.

The operation of lead and lag gates 32 and 34 may be explained with reference to the NTSC chromaticity diagram of FIG. 3. In that diagram, the chrominance of any color may be represented by specifying its phase or angular displacement with respect to a reference axis, in this case the B-Y axis, and its magnitude. The phase and magnitude correspond to the hue and saturation, respectively, of the color. As is conventional, the I or flesh axis leads the B-Y axis by 123°. Two supplementary axes are shown, a red axis lagging I by 30° and a yellow axis leading I by 30°. It may thus be seen that reference signals representing red and yellow hues are applied to red and yellow gates 32 and 34, respectively. Gates 32 and 34 detect the presence of colors in the chrominance signal lying in the area of the applied reference hue.

Each gate may conveniently comprise a transistor with the reference signal applied to the emitter, the chrominance signal applied to the base, and the output taken from the collector which is connected to a power supply through a resistance. The base should be biased so that the transistor will conduct only when signals of the same polarity are applied to the base and emitter within a phasic range of approximately 45°. The gate will thus only transmit applied chrominance signals having a phase within approximately ±22.5° of the applied reference signal. Such a gate will be more fully described subsequently. In FIG. 3 there are shown response curves centered about the red and yellow axes representing the gate apertures. These curves correspond to the relative magnitudes of the gate outputs for constant amplitude inputs as a function of the chrominance signal phase.

The output of lag gate 32 is applied to a 90° lead network 42 and the output of lead gate 34 is applied to a 90° lag network 44. Lead network 42 develops a quadrature signal at its output 90° ahead of its input while lag network 44 develops a quadrature signal at its output 90° behind its input. The outputs of networks 42 and 44 are combined and applied to a first input of a summer 46. The chrominance signal from the output of isolation amplifier 30 is applied to a second input of summer 46. Summer 46 adds the developed correction signals from lead and lag networks 42 and 44 to the chrominance signal to form the corrected chrominance signal. It also isolates the input of the circuit from its output while passing the chrominance signal to summer 46. The corrected signal is taken from an output of summer 46 and applied to an output terminal 48 and in turn to the chrominance demodulator 6 in FIG. 1. In some applications of this embodiment it may be preferable to vary the phase lead and lags of networks 38, 40, 42 and 44 to achieve optimum results. The embodiment of FIG. 4 includes certain improvement inventions on which separate, copending applications have been filed, specifically application Ser. No. 863,236 of Paul J. Whiteneir, Jr. filed on Oct. 2, 1969 for Hue Expander Circuits, and application Ser. No. 33,708 of Paul E. Knauer and John M. Kresock, filed on May 1, 1970 for Hue Expander Circuit Preference Control.

Figure 4:
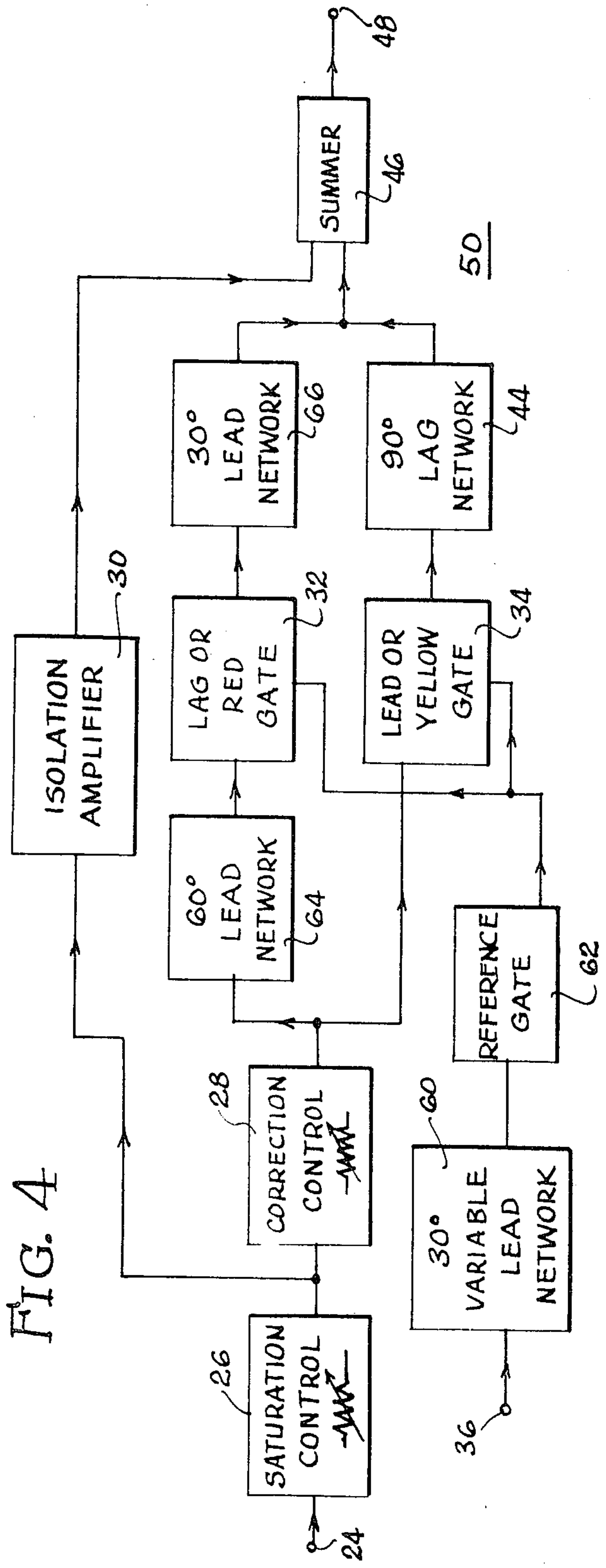
FIG. 4 is a block diagram of an apparatus incorporating an embodiment of this invention which is a variation on that of FIG. 2.

In FIG. 4 is disclosed an embodiment 50 of this invention similar to the first specific embodiment of FIG. 2. The components of the two embodiments having the same function are similarly numbered and their description need not be repeated here. The 3.58 MHertz continuous wave reference signal at I phase is applied to terminal 36 which is, in turn, connected to an input of a 30° variable lead network 60. The signal at an output of variable lead network 60 leads the input signal in phase by approximately 30°, but the network may, conveniently, have a means for varying the amount of lead. That output signal is applied to an input of a reference gate 62 having a 3.58 MHertz signal with an approximately rectangular shape. It may conveniently comprise a transistor gate biased to conduct over a predetermined phasic range of the input signal. That output is then delivered to lag and lead gates 32 and 34.

The chrominance signal from the output of correction control 28 is applied to an input of lead gate 34 and to an input of a 60° lead network 64, the output of that network leading its input by 60° at 3.58 MHertz, and thence to an input of lag gate 32. Lead or yellow gate 34 detects the presence of received hues in the vicinity of yellow and its output is coupled to 90° lag network 44 and thence to summer 46, as in the above-described first specific embodiment. Since the reference signal applied to gate 32 is approximately 30° advanced in phase from I and the chrominance signal applied to gate 32 is 60° advanced in phase from its received value, gate 32 will detect the presence of received hues in the vicinity of red. Its output is then applied to a 30° lead network 66 having an output leading its input by 30° at 3.58 MHertz. The output of that network is also applied to summer 46.

Since the total phase advance of networks 64 and 66 is 90°, the correction signal added to the chrominance signal by the output of lead network 66 at the summer will be the same as that added by the output of lead network 42 in the embodiment of FIG. 2. Additionally, by adjusting the phase lead of variable lead network 60, the hue of the reproduced flesh color may be varied to suit the individual viewer's preference. As with the embodiment of FIG. 2, in some applications of this embodiment it may be preferable to vary the phase lead and lags of networks 44, 60, 64 and 66 to achieve optimum results.

Figure 5:
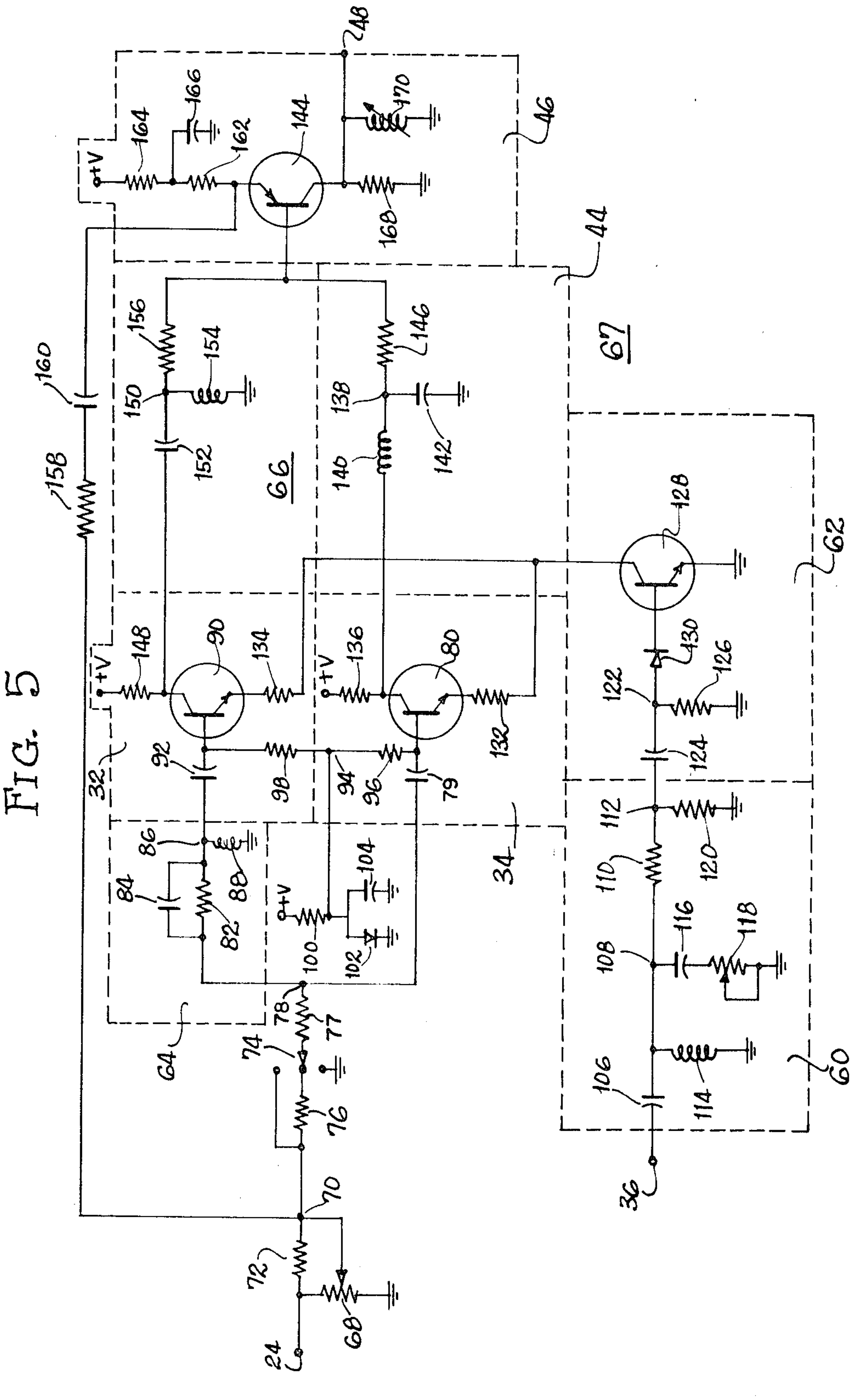
FIG. 5 is a schematic diagram of an apparatus incorporating the embodiment of FIG. 4.

A schematic diagram of a circuit 67 of the embodiment of FIG. 4 is shown in FIG. 5. The received chrominance signal is applied to an input terminal 24 which is connected both to ground through the resistive element of a saturation potentiometer 68 and to circuit point 70 through a resistor 72. The wiper arm of potentiometer 68 is connected to circuit point 70. A first contact of a single pole triple throw correction control switch 74 is directly connected to the circuit point 70, a second contact is coupled to circuit point 70 through a resistor 76, and a third contact is connected to ground. The movable contact of correction circuit switch 74 is coupled through a resistor 77 to a circuit point 78 which is, in turn, coupled through a blocking capacitor 79 to the base of an NPN lead gate transistor 80 and through the parallel combination of a resistor 82 and a capacitor 84 to a circuit point 86. Circuit point 86 is coupled to ground through an inductor 88 and to the base of an NPN lag gate transistor 90 through a blocking capacitor 92. The combination of resistor 82, capacitor 84, and inductor 88 forms a 60° phase shifting network. The bases of transistors 80 and 90 are coupled to a circuit point 94 through resistors 96 and 98, respectively, which is, in turn, coupled both to a source of positive voltage V through a dropping resistor 100 and to ground through the parallel combination of a diode 102 and a filter capacitor 104. Diode 102 is oriented so that its direction of high positive conductivity is towards ground. A voltage is developed at circuit point 94 so that, in the quiescent state, transistors 80 and 90 are biased at their point of conduction onset.

In certain applications of this invention it has been found convenient to use a reference signal circuit 5 supplying a signal at R-Y phase rather than at I phase as discussed above in relation to FIG. 4. The nominal phase lead of variable lead network 60 is then 63° rather than 30°. Accordingly, a continuous wave 3.58 MHertz reference signal at R-Y phase is applied to an input terminal 36 which is coupled through a capacitor 106 to a terminal point 108 and, in turn, through a resistor 110 to a terminal point 112. Terminal point 108 is coupled to ground both through an inductor 114 and through the series combination of a capacitor 116 and the resistive element of a phase-adjusting potentiometer 118. The wiper arm of potentiometer 118 is also connected to ground. Circuit point 112 is coupled to ground through a resistor 120 and to a circuit point 122 through a capacitor 124. Circuit point 122 is coupled to ground through a resistor 126 and to the base of an NPN reference gate transistor 128 through a diode 130, the diode being oriented so that its direction of high positive conductivity is toward the base of transistor 128. Diode 130 thus protects the transistor 128 from reverse voltages and aids in shaping and controlling the width of the collector current pulses in transistor 128. The total phase shift between input terminal 36 and circuit point 122 is approximately 63° leading but this may be varied by adjusting potentiometer 118.

The emitter of transistor 128 is connected to ground while the collector is coupled to the emitters of transistors 80 and 90 through resistors 132 and 134, respectively. Transistor 128 conducts during only a small phasic portion of the applied reference signal, here approximately 30° centered about the reference signal positive peak. The collector of transistor 80 is coupled to a source of positive voltage V through a resistor 136 and to a circuit point 138 through an inductor 140; circuit point 138 is coupled both to ground through a capacitor 142 and to the base of an PNP summer transistor 144 through a resistor 146. The collector of transistor 90 is coupled to a source of positive voltage V through a resistor 148 and to a circuit point 150 through capacitor 152; circuit point 150 is coupled both to ground through an inductor 154 and to the base of transistor 144 through resistor 156.

The phase lag between the base of transistor 144 and the collector of transistor 80 is approximately 90° while the phase lead between the base of transistor 144 and the collector of transistor 90 is approximately 30°. Circuit point 70 is coupled through the series combination of resistor 158 and capacitor 160 to the emitter of transistor 144. In this particular embodiment a separate isolation amplifier 30 of FIG. 4 was not found necessary. The emitter of transistor 144 is coupled to a source of positive voltage V through the series combination of resistors 162 and 164; the junction of those two resistors is coupled through capacitor 166 to ground. The collector of transistor 144 is coupled to ground through the parallel combination of resistor 168 and variable inductor 170 and to output terminal 48. Inductor 170 together with its stray capacitance is tuned to approximately 3.58 MHertz. Transistor 144 performs the functions of isolation amplifier 30 and summer 46 of the embodiment of FIG. 4.

In one application of the embodiment of FIG. 5, the components used had the following values:

| | |
|---|---|
| Resistor 68 | 500 ohms |
| Resistor 72 | 390 ohms |
| Resistor 76 | 560 ohms |
| Resistor 77 | 560 ohms |
| Capacitor 79 | 0.01 microfarads |
| Resistor 82 | 2.2 kilohms |
| Capacitor 84 | 43 picofarads |
| Inductor 88 | 27 microhenries |
| Capacitor 92 | 0.01 microfarads |
| Resistor 96 | 2.2 kilohms |
| Resistor 98 | 2.2 kilohms |
| Resistor 100 | 10 kilohms |
| Capacitor 104 | 0.01 microfarads |
| Capacitor 106 | 47 picofarads |
| Resistor 110 | 330 ohms |
| Inductor 114 | 6.8 microhenries |
| Capacitor 116 | 150 picofarads |
| Potentiometer 118 | 6 kilohms |
| Resistor 120 | 820 ohms |
| Capacitor 124 | 0.01 microfarads |
| Resistor 126 | 8.2 kilohms |
| Resistor 132 | 220 ohms |
| Resistor 134 | 270 ohms |
| Resistor 136 | 1 kilohm |
| Inductor 140 | 56 microhenries |
| Capacitor 142 | 20 picofarads |
| Resistor 146 | 4.7 kilohms |
| Resistor 148 | 1 kilohm |
| Capacitor 152 | 20 microfarads |
| Inductor 154 | 120 microhenries |
| Resistor 156 | 4.7 kilohms |
| Resistor 158 | 330 ohms |
| Capacitor 160 | 0.01 microfarads |

| | |
|---|---|
| Resistor **162** | 330 ohms |
| Resistor **164** | 680 ohms |
| Capacitor **166** | 0.01 microfarads |
| Resistor **168** | 1.5 kilohms |
| Inductor **170** | 12–35 microhenries |

The transistor types used were:

| | |
|---|---|
| Transistor **80** | SE5025 |
| Transistor **90** | SE5025 |
| Transistor **128** | 2N5134 |
| Transistor **144** | 2N4916 |

The positive voltage source V used was 20 volts and this developed a 0.6-volt bias at circuit point 94.

Figure 6:
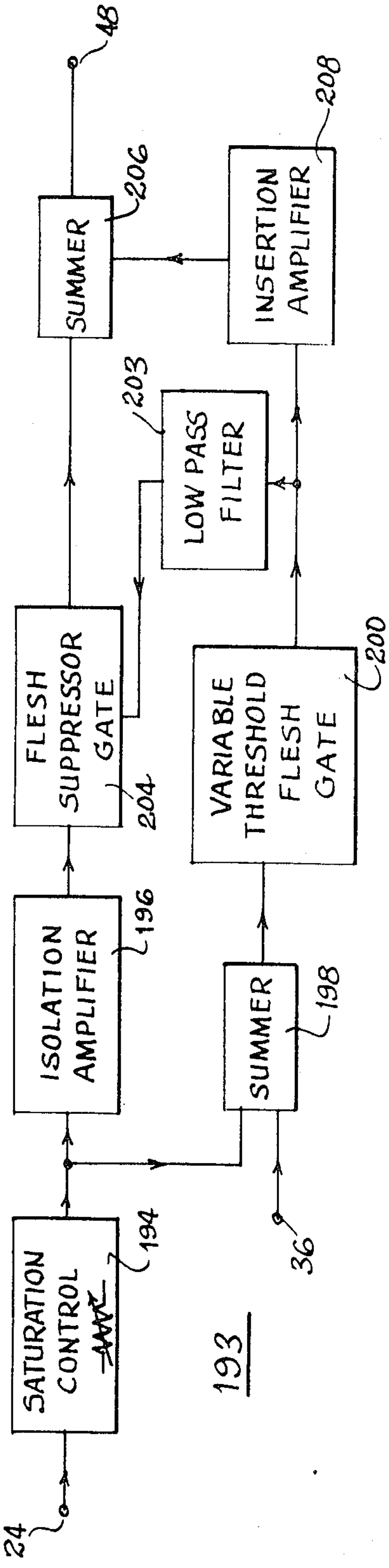
FIG. 6 is a block diagram of an apparatus incorporating another specific embodiment of this invention.

A second specific embodiment 193 of this invention is disclosed in FIG. 6. A received chrominance signal is applied to input terminal 24 and thence to a saturation control 194. The saturation control may be comprised of a variable resistance for adjusting the amplitude of the chrominance signal applied to the remaining elements of the circuit. The output of the saturation control is applied to both an isolation amplifier 196 and a first input of a first summer 198. Isolation amplifier 196 isolates the input of the circuit from its output. A 3.58 MHertz continuous wave reference signal at I or flesh phase is applied to an input terminal 36 and thence to a second input of summer 198. The output of summer 198 is the sum of the signals at its first and second inputs and is applied to an input of a variable threshold flesh gate 200. Gate 200 is a conventional gate or threshold circuit biased to conduct or transmit its input signal to its output only when the amplitude of the applied input signal is greater than a predetermined variable level.

Figure 3:
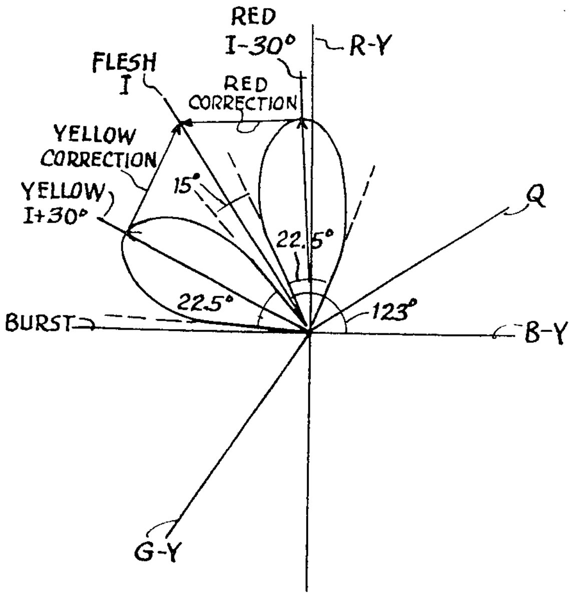
FIG. 3 is an NTSC chromaticity diagram for aid in understanding the embodiment of FIG. 2.
Figure 7:
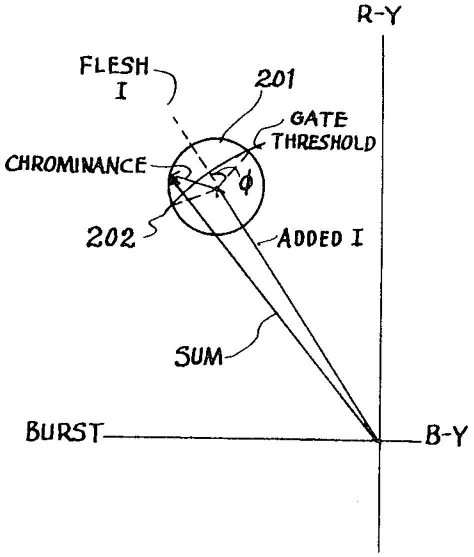
FIG. 7 is an NTSC chromaticity diagram for aid in understanding the embodiment of FIG. 6.

In FIG. 7 the second quadrant of an NTSC chromaticity diagram similar to that of FIG. 3 is shown for illustrating the operation of the summer 198 and gate 200. The added I vector represents the I-axis signal applied at input terminal 36. The chrominance vector represents the chrominance signal applied to summer 198; it has a small magnitude relative to the added I vector and has been transposed to the tip of the I vector. The circle 201 represents the possible range of chrominance signals with a given constant amplitude. It may thus be seen that for a given amplitude chrominance signal, the sum vector of the added I vector and the chrominance vector will have a maximum magnitude when the chrominance signal is at I phase and will decrease in magnitude as the phase moves away from I. If the conduction threshold of gate 200 is represented by the circular segment 202 in FIG. 7, the gate will only conduct when a chrominance signal of the illustrated magnitude is within a predetermined phasic angle, $\phi$, of flesh so that the sum vector extends beyond circle 202. Gate 200 may thus be used to detect the presence of received chrominance signals at or near flesh. It may further be seen from FIG. 7 that if the relative magnitude of the added I phase vector is sufficiently greater than the magnitude of the chrominance vector, when the chrominance vector is at a phase different from I phase the sum vector will have an angle which is significantly closer to the I axis than the original chrominance vector; thus when the chrominance signal is representative of a hue other than flesh, the hue produced by the sum vector will always be closer to flesh than the hue of the chrominance signal.

The phase range detected by gate 200 will vary with the amplitude of the applied chrominance signal, as may easily be seen by observing the variations in phasic angle $\phi$ caused by changes in the radius of circle 201. In any individual application of this invention the amplitude of the chrominance and reference signals applied to summer 198 and the threshold level of gate 200 may be adjusted for optimum results.

The output of gate 200 is coupled through a low pass filter 203 to a control input of a flesh suppressor gate 204. Filter 203 merely smoothes the 3.58 MHertz signal to make it suitable for control of flesh suppressor gate 204; in some applications of this embodiment it may be omitted. The output of isolation amplifier 196 is applied to a signal input of flesh suppressor gate 204. Gate 204 is a conventional gate and is such that when a signal is applied to its control input from gate 200, indicating the presence of a hue near flesh in the received chrominance signal, the chrominance signal input from isolation amplifier 196 is not allowed to pass to the gate output.

The output of gate 204 is applied to a first input of a second summer 206. The output of gate 200 is additionally coupled to a second input of summer 206 through an insertion amplifier 208. Insertion amplifier 208 scales down the sum vector output of gate 200 to a level compatible with the chrominance signal level and then applies it to summer 206. Amplifier 208 may have a variable gain to adjust the magnitude of the inserted signal. The output of summer 206 is connected to output terminal 48. The signal at the output terminal will thus comprise the original chrominance signal when the hue of that signal is not near flesh and the scaled down sum signal when the hue of the original is near flesh.

Figure 8:
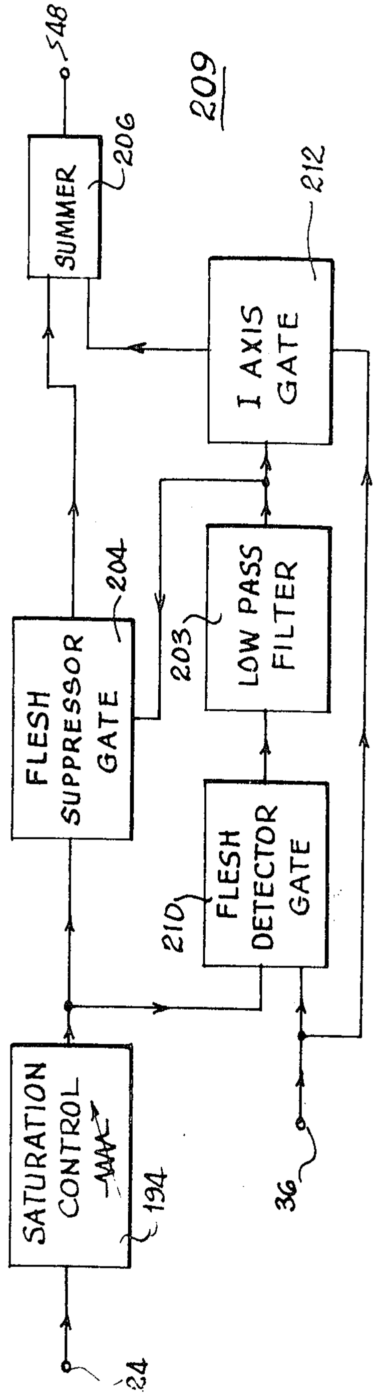
FIG. 8 is a block diagram of an apparatus incorporating an embodiment of this invention which is a variation on that of FIG. 6.

An embodiment 209 of this invention which is a variation on the second specific embodiment of FIG. 6 is disclosed in FIG. 8. The components of the two embodiments having the same function are similarly numbered and their description will not be repeated here. The received chrominance signal is applied to input terminal point 24 and thence through saturation control 194 to both the input of flesh suppressor gate 204 and to a first input of a flesh detector gate 210. A 3.58 MHertz continuous wave reference signal at I phase is applied to input terminal 36 and thence to a second input of flesh detector gate 210 and to an input of an I-axis gate 212. Flesh detector gate 210 detects the presence in the received chrominance signal of signals having a phase near that of the reference signal applied to terminal 36. As such, it may have a construction similar to those of lead and lag gates 32 and 34 discussed above. It will have an output signal only when the phase of the chrominance signal is within a predetermined range. The output of gate 210 is coupled to a low pass filter 203 and, then, to both a control input of flesh suppressor gate 204 and a control input of I-axis gate 212. An output of I-axis gate 212 is applied to a first input of summer 206 and the output of flesh suppressor gate 204 is applied to a second input of summer 206. Flesh suppressor gate 204 is such that the chrominance signal either does not appear or appears at a reduced magnitude at its output when a signal from flesh detector gate 210 is applied to its control input. I-axis gate 212 is a conventional gate and such that a reference signal at I or flesh phase appears at its output only when a signal from flesh detector gate 210 is applied to its control input. The output of summer 206 at output terminal 48 is thus the original chrominance signal when its hue is not near flesh and the reference signal at I phase when the hue of the chrominance signal is near flesh.

As discussed above with reference to the embodiment of FIG. 6, the phase range detected by gate 200 will vary with the amplitude of the applied chrominance signal. Similar behavior may be observed in gates of other embodiments having a detectionike function. Additionally, it has been empirically determined that flesh signals are generally of relatively low saturation. It would thus be advantageous to include within the embodiment of FIG. 6 circuitry which would reduce the effectiveness of the flesh expander circuit on application of large amplitude chrominance signals, that is, highly saturated colors, which are in the flesh hue area, and pass them substantially uncorrected to the chrominance demodulator. Such colors could be presumed to be background colors within the phasic range of this flesh-correcting system. One method of doing this is to include a leveler circuit within the first, chrominance signal, input to summer 198. The function of such a circuit is to clamp the peak level of all applied chrominance signals at a predetermined level, thus reducing the phasic angle $\phi$ in which large amplitude chrominance signals will cause the summer output to exceed the gate conduction threshold.

Figure 9:
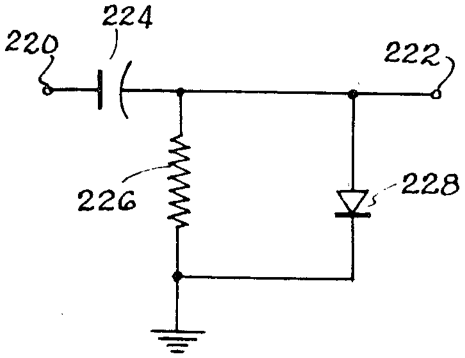
FIG. 9 is a schematic diagram of a first leveler circuit.
Figure 10:
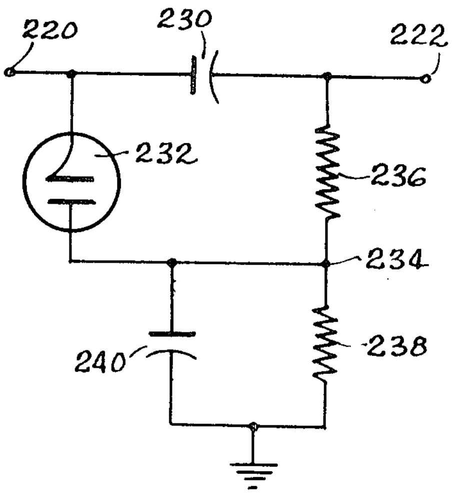
FIG. 10 is a schematic diagram of a second leveler circuit.

Two such circuits are shown in FIGS. 9 and 10. If included within summer 198, they would be in series with the first input. The input of each circuit is at a terminal 220 and the output at a terminal 222. The circuit disclosed in FIG. 9 comprises a capacitor 224 connected between terminals 220 and 222 and a parallel combination of a resistor 226 and a semiconductor diode 228 connected between terminal 222 and ground. Diode 228 is oriented so that its direction of high positive conductivity is toward ground.

The circuit disclosed in FIG. 10 comprises a capacitor 230 connected between terminals 220 and 222, a vacuum diode 232 connected between terminal 220 and circuit point 234 and oriented so that its direction of high negative conductivity is toward circuit point 234, a resistor 236 connected between terminal point 222 and circuit point 234, and a parallel combination of a resistor 238 and a capacitor 240 connected between terminal point 234 and ground. Vacuum diode 232 will, of course, include a suitably heated filament. The circuit of FIG. 10 gives more latitude in selecting time constants to minimize clipping and distortion than that of FIG. 9.

In particular applications of each of the leveler circuits of FIGS. 9 and 10, the components used had the following values:

| | |
|---|---|
| Capacitor 224 | 40 picofarads |
| Resistor 226 | 47 kilohms |
| Capacitor 230 | 10 picofarads |
| Resistor 236 | 32 kilohms |
| Resistor 238 | 16 kilohms |
| Capacitor 240 | 20 picofarads |

In each case large amplitude chrominance signals would be clamped to a maximum level by the diode lowering their DC level and only minor correction would be provided by the entire flesh correction system.

Figure 11:
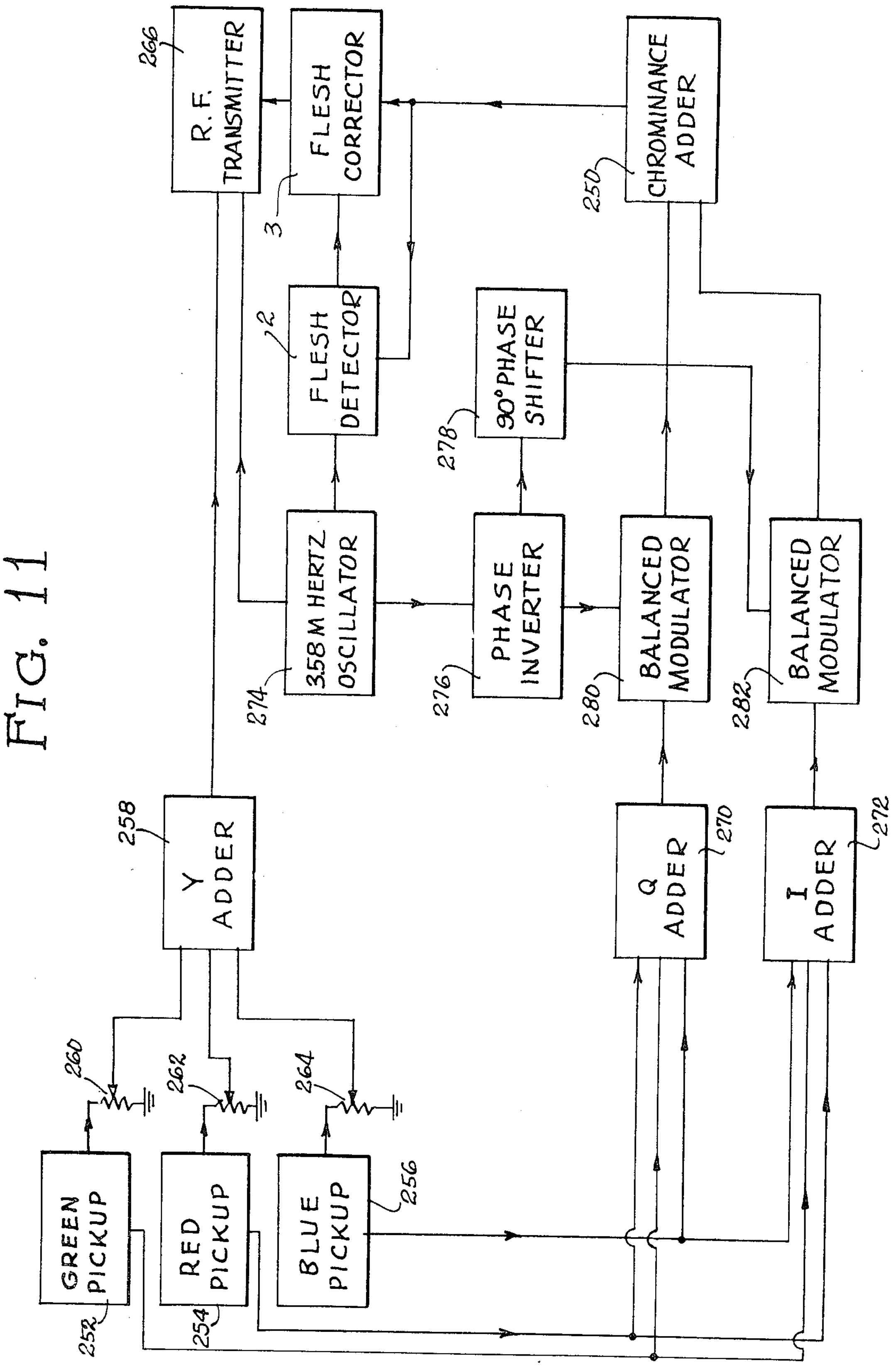
FIG. 11 is a block diagram of a transmitter incorporating a generalized embodiment of this invention.

A color television transmitter incorporating the generalized embodiment of this invention is disclosed in FIG. 11. As discussed above in relation to FIG. 1, it is comprised of a flesh detector 2 which detects the presence of a hue in the vicinity of flesh in a received chrominance signal and has an output coupled to a flesh corrector 3 which modifies that received chrominance signal. The remaining components are conventional and well known; they will be described only briefly.

Green red, and blue pickups, 252, 254, and 256, respectively, originate the green, red and blue color signals and have outputs coupled to a Y-adder 258 through variable resistances 260, 262, and 264. Y-adder 258 matrixes the green, red, and blue signals to form the Y or luminance signal. Its output is applied to a radio frequency transmitter 266. The green, red and blue signals from pickups 252, 254 and 256 are applied to adders 270 and 272 which appropriately matrix the applied signals to form the Q and I signals, respectively.

A 3.58 MHertz oscillator 274 supplies a chrominance subchannel carrier signal to RF transmitter 266 and a phase inverter 276. The output of phase inverter 276 is phase shifted from the carrier by 180° and is applied to 90° phase shifter 278 which phase shifts that signal by another 90°. Outputs from Q adder 270 and phase inverter 276 are coupled to inputs of a balanced modulator 280 while outputs from I adder 272 and phase shifter 278 are coupled to inputs of a balanced modulator 282. The balanced modulators produce at their outputs 3.58 MHertz, amplitude modulated, suppressed carrier I and Q signals in quadrature. The I and Q signals are band limited and combined by chrominance adder 250 to form the chrominance signal which is applied both to flesh detector 2 and flesh corrector 3. An output from 3.58 MHertz oscillator 274 is also applied to flesh detector 2. The modified chrominance signal from flesh corrector 3 is applied to RF transmitter 266. The RF transmitter combines the luminance, chrominance, synchronization, and audio signals and modulates them onto a radiofrequency carrier. Flesh detector 2 and flesh corrector 3 are similar to those of the above-discussed embodiments.

It will be obvious that many modifications of the specific embodiments shown may be made without departing from the spirit and scope of this invention. For example, while the order and manner in which the various vector transformations of the fixed phase reference signals and the received chrominance signals are preformed are very simple and convenient, they could be done in many different ways while still falling within the scope of this invention. Further, many modifications could be made to the described circuitry without taking it outside the scope of this invention.

It will also be apparent that this invention could be used in many different applications. The received signal on which it operates could originate from any one of a number of sources. The received signal might be derived from another signal which has been electromagnetically transmitted, or it might be electromagnetically transmitted itself. The received signal might be supplied from a transmission cable or from a prior stage in a signal-processing device. Additionally, the received signal might be received in a digital, discrete form rather than a continuous form.

It will thus be seen that method and apparatus have been provided for detecting the presence in a received signal of information within a predetermined information range and then modifying that signal toward a preset reference. More particularly, methods and apparatus have been provided for determining when the hue information in a received NTSC chrominance channel signal is within a predetermined information range and then modifying that signal toward a preset reference. Still more particularly, methods and apparatus have been provided for determining when the hue information in a received NTSC chrominance channel signal is within a predetermined range including a preset hue, most usefully that of flesh, and modifying that received chrominance signal toward that hue. Further, the method and apparatus provided fulfill all the above-mentioned objects.

While several particular embodiments of this invention are shown above, it will be understood, of course, that the invention is not to be limited thereto since many modifications may be made. It is contemplated, therefore, by the appended claims, to cover any such modifications as fall within the true spirit and scope of this invention.

We claim:

1. The method of modifying a received electrical signal having a phase parameter representative of information and variable over a wide range of useful values comprising the steps of:
   - detecting when said phase parameter of said received signal is within a predetermined narrower range;
   - generating a correction signal when the presence of said phase parameter within said predetermined narrower range is detected; and
   - combining said correction signal and said received signal to form a modified received signal wherein said phase parameter and said information are altered.

2. The method of claim 1 wherein said combining step comprises the step of adding said correction signal to said received signal.

3. The method of modifying a received electrical signal having a parameter representative of information and variable over a wide range of useful values comprising the steps of:
   - detecting when the parameter of said received signal is within a predetermined narrower range;
   - generating a correction signal when the presence of said parameter within said predetermined narrower range is detected;
   - suppressing those parts of said received signal having said parameter within said predetermined narrower range; and
   - substituting said correction signal for said suppressed parts to form a modified received signal wherein said parameter and said information are altered.

4. In a color television system, the method of altering the hue parameter in a received signal comprising the steps of:
   - detecting when the parameter of said received signal is within a predetermined range;
   - generating a correction signal when said parameter is within said predetermined range; and combining said received signal and said correction signal to produce a phase modified signal with said parameter representative of an adjusted hue within said range.

5. The method of claim 4 wherein said combining step comprises the step of adding said correction signal to said received signal.

6. The method of claim 4 wherein said combining step comprises the steps of:

suppressing those parts of said received signal when said parameter is within said predetermined range; and substituting said correction signal for said suppressed parts.

7. Hue-altering apparatus for a color television system comprising:

chrominance channel receiving means for supplying a received chrominance signal;

reference signal generator means for generating a reference signal at a predetermined phase;

detector means coupled to said chrominance channel receiving means and said reference signal generator means for detecting when the phase of said received chrominance signal is within a predetermined range; and corrector means coupled to said detector means and said chrominance channel receiving means for generating a correction signal and combining said correction signal and said received chrominance signal to form a corrected signal having altered phase characteristics.

8. The apparatus of claim 7 wherein said corrector means comprises:

means for phase shifting the received chrominance signal; and means for adding the phase shifted signal to said received chrominance signal.

9. The apparatus of claim 8 further comprising means for manually adjusting the relative magnitude of said phase-shifted signal and said received chrominance signal.

10. The apparatus of claim 7 wherein said corrector means comprises:

means for generating a correction signal having a phase more closely approximating a predetermined phase than the phase of said received chrominance signal; and means for substituting said correction signal for said received chrominance signal when the phase of said received chrominance signal is within said predetermined range.

11. The apparatus of claim 10 wherein said predetermined phase is that phase which corresponds to a flesh hue on the picture tube of the receiver.

12. Hue-altering apparatus for a color television transmitter comprising:

carrier signal generating means for generating a carrier signal;

chrominance channel originating means for originating a chrominance signal having a variable phase relationship to said carrier signal;

detector means coupled to said carrier signal generating means and said chrominance signal originating means for detecting when said phase relationship is within a predetermined range; and corrector means coupled to said detector means and said chrominance channel originating means for generating a correction signal and combining said correction signal and said chrominance signal to form a corrected signal having altered hue characteristics.

13. The apparatus of claim 12 wherein said corrector means comprises:

means for phase shifting the chrominance signal; and means for adding the phase-shifted signal to said chrominance signal.

14. In a color television system, apparatus for altering the hue parameter in a delivered signal comprising:

detection means for detecting when the hue parameter of said delivered signal is within a predetermined range;

correction signal generating means for generating a correction signal when said parameter is within said predetermined range; and combining means for combining said delivered signal and said correction signal to produce a phase modified signal having said hue parameter altered to a new value within said range when said delivered signal hue parameter is within said range.

15. The apparatus of claim 14 wherein said combining means comprises means for adding said correction signal to said delivered signal.

16. The apparatus of claim 14 wherein said combining means comprises:

suppressing means for suppressing those parts of said received signal having said hue parameter within said predetermined range; and substitution means for substituting said correction signal for said suppressed parts.

17. In a color television system, apparatus for translating a delivered chrominance signal bearing chrominance information in a predetermined form and forming a modified chrominance signal comprising:

means for selecting the components of said delivered chrominance signal having a phase within a predetermined range and delivering said components at an output;

means coupled to said output and responsive to the presence of said selected components for generating a correction signal;

means for combining said delivered chrominance signal and said correction signal and forming a phase modified chrominance signal bearing chrominance information in said predetermined form.

18. The apparatus of claim 17 wherein said correction signal combining means comprises means for adding said correction signal to said delivered chrominance signal.

19. The apparatus of claim 17 wherein said correction signal generating means comprises means for phase shifting said selected components and said correction signal combining means comprises means for adding said phase shifted selected components to said delivered chrominance signal.

20. The apparatus of claim 17 wherein said correction signal combining means comprises means for suppressing those components of said delivered signal having a phase within said predetermined range and means for substituting said correction signal for said suppressed components to form said modified chrominance signal.

21. In a color television system, apparatus for altering the phase of a delivered chrominance signal comprising:

means for selecting the components of said delivered chrominance signal having a phase within a predetermined range;

means for altering the phase of said selected components; and means for combining said phase-altered selected components with said delivered chrominance signal to produce a phase-altered chrominance signal.

22. The apparatus of claim 21 wherein said combining means comprises means for adding said phase altered selected components and said delivered chrominance signal.

23. A color television hue altering apparatus comprising:

chrominance channel means for supplying a chrominance signal;

picture tube reproduction means for reproducing color television pictures;

detection means for selecting the components of said chrominance signal within a predetermined phase range and delivering those components at an output;

correction signal generation means coupled to said output and responsive to the presence of said selected components for generating a correction signal;

translation means connected to said chrominance channel means and said picture tube reproduction means for translating said chrominance signal into a form capable of operating said picture tube means and supplying the chrominance information required to operate said picture tube means; and signal alteration means for altering the phase of said translated signal in response to said correction signal.

24. A color television hue-altering apparatus comprising:

chrominance channel means for supplying a chrominance signal;

picture tube reproduction means for reproducing color television pictures;

chrominance signal demodulator means coupled to said chrominance channel means and said picture tube for translating said chrominance signal into a form capable of operating said picture tube means;

detection means for selecting the components of said chrominance signal within a predetermined phase range and delivering those components at an output;

correction signal generation means coupled to said output and responsive to the presence of said selected components for generating a correction signal; and signal alteration means for altering phase said translated signal in response to said correction signal.

25. Hue-altering apparatus for a color television receiver comprising:

reference signal generating means for generating a reference signal at a predetermined phase;

chrominance channel means for supplying a delivered chrominance signal;

first gate means coupled to said chrominance channel means and said reference signal generating means for determining when the signals applied to it are in a first predetermined phasic relationship;

second gate means coupled to said chrominance channel means and said reference signal generating means for determining when the signals applied to it are in a second predetermined phasic relationship;

first phase shift means coupled to the output of said first gate means for phase shifting the output signal from said first gate means;

second phase shift means coupled to the output of said second gate means for phase shifting the output signal from said second gate means; and summer means coupled to said first phase shift means, said second phase shift means, and said chrominance channel means for combining the signals applied to it.

26. The hue-altering apparatus of claim 25 further comprising means for manually adjusting the relative magnitude of the signals applied to said summer means.

27. Color television hue-altering apparatus for modifying the portion of a delivered chrominance signal having a phase within a predetermined phase range toward a central phase comprising:

reference signal generating means for generating a reference signal at a predetermined phase;

chrominance channel means for supplying said delivered chrominance signal;

first gate means coupled to said reference signal generating means and said chrominance channel means for selecting those components in said delivered chrominance signal at a first predetermined phase lagging said central phase;

second gate means coupled to said reference signal generating means and said chrominance channel means for selecting those components in said delivered chrominance signal at a second predetermined phase leading said central phase;

first phase shift means coupled to said first gate means for phase advancing the components selected by said first gate means;

second phase shift means coupled to said second gate means for phase retarding the components selected by said second gate means; and summer means coupled to said first phase shift means, said second phase shift means, and said chrominance channel means for combining said delivered chrominance signal and said phase-shifted selected components.

28. The color television hue-altering apparatus of claim 27 wherein said central phase is the phase in said chrominance signal representative of flesh hue, said first predetermined phase lags said central phase by approximately 30°, and said second predetermined phase leads said central phase by approximately 30°.

29. The color television hue-altering apparatus of claim 27 wherein said first and second phase shift means alter the phase of said selected components by approximately 90°.

30. A color television hue-altering apparatus for modifying a delivered chrominance signal bearing chrominance information in a predetermined form comprising correction signal generating means for generating a correction signal in response to the phase parameter of said delivered chrominance signal, combining means for combining said delivered chrominance signal and said correction signal to form a phase modified chrominance signal bearing chrominance information in said predetermined form, and means for manually adjusting the relative magnitude of said combined chrominance signal and said correction signal.

31. The improvement of claim 30 wherein said manual adjustment means comprises means for manually varying the magnitude of a chrominance signal applied to said correction signal generating means.

32. Hue-altering apparatus for a color television system comprising:

reference signal generating means for generating a reference signal at a fixed frequency and a nominally fixed phase;

chrominance channel means for supplying a chrominance signal bearing information in the form of sideband components of a carrier wave at said fixed frequency;

gate means coupled to said chrominance channel means and said reference signal generating means for gating to an output portions of said chrominance signal occurring at predetermined phasic displacements relative to said nominally fixed phase; and signal combining means coupled to said chrominance channel means and said gate means output for combining said chrominance signal and said portions of said chrominance signal.

33. The hue-altering apparatus of claim 32 wherein said signal combining means comprises means for converting said gated portions of said chrominance signal into sine wave signals at said fixed frequency and means for adding said sine wave signals to said chrominance signal.

34. A color television hue altering apparatus comprising:

chrominance signal means for supplying a chrominance signal;

chrominance signal utilization means for using the chrominance information conveyed by said chrominance signal;

demodulator means coupled to said chrominance signal means and said utilization means for demodulating said chrominance signal and supplying the chrominance information required by said utilization means;

auxiliary detection means for detecting when the hue represented by said chrominance signal is within a predetermined range; and hue correction means coupled to said auxiliary detection means for altering the hue represented by the chrominance information supplied to said utilization means when the hue represented by said chrominance signal is within said predetermined range.

35. The color television hue altering apparatus of claim 34 wherein said hue correction means comprises correction signal generation means for forming a correction signal when the hue represented by said chrominance signal is within said predetermined range and combining means for combining said chrominance signal and said correction signal.

36. The color television apparatus of claim 35 wherein said combining means comprises means for adding said correction signal to said chrominance signal.

37. The apparatus of claim 35 wherein said combining means comprises:

suppressing means for suppressing those parts of said chrominance signal representing a hue within said predetermined range; and substitution means for substituting said correction signal for said suppressed parts.

38. In a color television system, apparatus for altering the hue parameter in a delivered signal comprising:

detection means for detecting when the hue parameter of said delivered signal is within a predetermined range having values on either side of a critical value;

correction signal generating means for generating a correction signal when said parameter is within said predetermined range; and combining means for combining said delivered signal and said correction signal to produce a signal with a hue parameter shifted toward said critical value when said delivered signal hue parameter is within said predetermined range.

39. The apparatus of claim 38 wherein said combining means comprises means for adding said correction signal to said delivered signal.

* * * * *

UNITED STATES PATENT OFFICE

CERTIFICATE OF CORRECTION

Patent No. 3,649,748 Dated March 14, 1972

Inventor(s) Paul E. Knauer

It is certified that error appears in the above-identified patent and that said Letters Patent are hereby corrected as shown below:

Column 4, lines 61-67, beginning with the following sentence:

"The embodiment of FIG. 4 includes certain improvement inventions on which separate, copending applications have been filed, specifically application Ser. No. 863,236 of Paul J. Whiteneir, Jr. filed on Oct. 2, 1969 for Hue Expander Circuits, and application Ser. No. 33,708 of Paul E. Knauer and John M. Kresock, filed on May 1, 1970 for Hue Expander Circuit Preference Control."

This sentence was added by our Amendment A, but the Patent Office inadvertently inserted it on the wrong line. It should appear on line 69 following "FIG. 2".

Column 14, line 9, (claim 29) "claim 27" should be "claim 28".

Signed and sealed this 26th day of September 1972.

(SEAL)
Attest:

EDWARD M.FLETCHER,JR.
Attesting Officer

ROBERT GOTTSCHALK
Commissioner of Patents